No. 854,394. PATENTED MAY 21, 1907.
C. W. G. ALLENDER.
COMBINED COLANDER AND CAKE PAN.
APPLICATION FILED FEB. 23, 1907.

Witnesses

Inventor
Chas. W. G. Allender,
By Franklin H. Hough
Attorney

UNITED STATES PATENT OFFICE.

CHARLES WRAY GRAYSON ALLENDER, OF WASHINGTON, PENNSYLVANIA.

COMBINED COLANDER AND CAKE-PAN.

No. 854,394.

Specification of Letters Patent.

Patented May 21, 1907.

Application filed February 23, 1907. Serial No. 358,939.

*To all whom it may concern:*

Be it known that I, CHARLES WRAY GRAYSON ALLENDER, a citizen of the United States, residing at Washington, in the county of Washington and State of Pennsylvania, have invented certain new and useful Improvements in a Combined Colander and Cake-Pan; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in combined colanders and cake pans, and consists in the provision of a simple and efficient device of this nature which may be utilized equally well either as a colander having a rotary stirrer therein, or as a cake pan having a false bottom with a space intervening between the same and the bottom of the cake pan, thereby preventing the material from being burned.

My invention is illustrated in the accompanying drawings, in which:—

Figure 1:
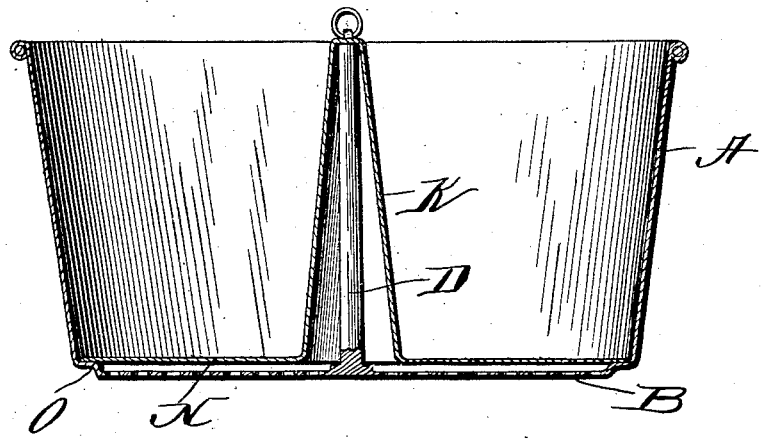
Figure 2:
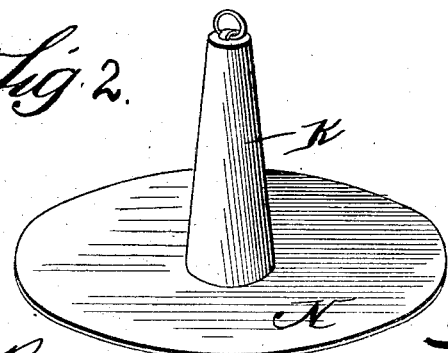

Figure 1 is a vertical sectional view of the invention shown as adjusted for use as a cake pan. Fig. 2 is a detail view of the removable false bottom.

Reference now being had to the details of the drawings by letter, A designates a receptacle which may be of any suitable size or shape, and provided with a bottom B having a series of perforations in the bottom thereof forming a strainer when the device is used as a colander. Rising centrally from said bottom is a post D.

When the device is adjusted for use as a cake pan the conical-shaped member K is placed over the central post D and upon which it rests. The lower end of said conical member has a disk part N which conforms to the contour of the receptacle A, and is adapted to rest upon the shoulder O formed a slight distance above the perforated bottom, thereby leaving a space intervening between the bottom of the disk flange N and the perforated bottom, and in which air may circulate.

From the foregoing, it will be noted that by the provision of a device made as shown and described, a receptacle is afforded for use either as a strainer or colander when the false bottom is removed, and when the false bottom is applied to the receptacle and resting upon the annular shoulder about the marginal edge of the perforated bottom, a space intervenes between the perforated bottom and the flange N, thereby preventing the cake from burning.

What I claim is:—

In combination with a receptacle having a perforated bottom and an annular raised flange about the marginal edge of said bottom and integral therewith, a solid post rising centrally from said perforated bottom, a conical-shaped member closed at its top and resting upon said post, the lower portion of said conical-shaped member formed into a circular-outlined disk adapted to rest upon said annular shoulder and spaced apart from the perforated bottom, as set forth.

In testimony whereof I hereunto affix my signature in the presence of two witnesses.

CHARLES WRAY GRAYSON ALLENDER.

Witnesses:
T. JEFF. DUNCAN,
O. S. CHALFANT.